IMAGE DISPLAY SYSTEM USING MECHANICALLY EMBOSSED OPTICAL RECORD

Filed Aug. 2, 1961 5 Sheets-Sheet 1

INVENTOR.
Robert G. Day
BY Wallenstein, Spangenberg & Hattis
Attys.

Oct. 5, 1965 R. G. DAY 3,210,466

IMAGE DISPLAY SYSTEM USING MECHANICALLY EMBOSSED OPTICAL RECORD

Filed Aug. 2, 1961 5 Sheets-Sheet 2

INVENTOR.
Robert G. Day
BY Wallenstein, Spangenberg & Hattis
Attys

Oct. 5, 1965 R. G. DAY 3,210,466

IMAGE DISPLAY SYSTEM USING MECHANICALLY EMBOSSED OPTICAL RECORD

Filed Aug. 2, 1961 5 Sheets-Sheet 3

INVENTOR.
Robert G. Day
BY Wallenstein, Spangenberg & Hattis
Attys.

INVENTOR.
Robert G. Day
BY Wallenstein, Spangenberg & Hattis
Attys.

Oct. 5, 1965 R. G. DAY 3,210,466

IMAGE DISPLAY SYSTEM USING MECHANICALLY EMBOSSED OPTICAL RECORD

Filed Aug. 2, 1961 5 Sheets-Sheet 5

INVENTOR.
Robert G. Day
BY Wallenstein, Spangenberg & Hattis
Attys

United States Patent Office 3,210,466
Patented Oct. 5, 1965

3,210,466

IMAGE DISPLAY SYSTEM USING MECHANICALLY EMBOSSED OPTICAL RECORD

Robert G. Day, Middlesex, N.J., assignor to Gulton Industries, Inc., Metuchen, N.J., a corporation of New Jersey Filed Aug. 2, 1961, Ser. No. 128,778
16 Claims. (Cl. 178—7.3)

The principal object of this invention is to provide a high-brightness storage-display system wherein information is permanently recorded on a smooth synthetic plastic tape by embossing the tape in accordance with said information, wherein the tape with the embossed information recorded thereon may be stored, if desired, for future use and display, and wherein the embossed information recorded on the tape may, if desired, be immediately or later displayed by an optical high-brightness display system with optimum speed, resolution, high-brightness and ability to produce a gray scale. This is accomplished, in accordance with this invention, in a simple, straightforward and foolproof mechanical manner, without expensive, bulky, inconvenient and unreliable equipment such as used in fast film processing systems, and without the need for vacuum, cumbersome vacuum pumping systems, and complicating requirements for high precision scanning, accurate dynamic focusing, exacting electron gun adjustment and highly skilled maintenance as are present in the so-called Eidophor or Light Valve systems.

Briefly, in accordance with this invention, the information to be recorded and displayed is scanned and transmitted by a conventional video or facsimile system to a recording means having recording styli which emboss the information in a pattern of scanning lines on a smooth synthetic plastic tape. The term "video" as used herein is used in its broader sense pertaining to systems for transmission or reception of images or the like and is not limited to its narrower sense pertaining to television systems having band widths in the order of 3 to 4 megacycles. The embossed tape is transported adjacent to a light source which projects light upon the embossed tape and then onto a projection screen. Means including a stop system, such as a slit and bar stop system, masks the screen from light incident from the tape and projects onto the screen light deflected by the embossing on the tape for visually displaying the embossed information on the screen. The smooth synthetic plastic tape may be a transparent tape where the light is projected through the tape onto the projection screen, the light being refracted by the embossing on the tape. Alternatively, the smooth synthetic plastic tape may be a reflecting tape where the light is reflected by the embossing on the tape onto the projection screen.

Preferably, the recording means includes a rotating head provided with the embossing styli which engage a face of the tape, a guide means or platen for guiding the tape adjacent the rotary head, and means for relatively moving the tape and the rotating head for embossing the information on the tape in a plurality of scanning lines. In displaying the embossed information on the screen, the embossed tape may be fed past the light source at a substantially constant speed for displaying the information on the screen in moving fashion, or the embossed tape may be stationarily positioned adjacent the light source for displaying the information on the screen in stationary fashion. Also, the information may be embossed on the tape in spaced apart frames, each frame consisting of a plurality of embossed scanning lines, and the embossed information of the frames may be individually displayed on the screen in stationary fashion.

The embossing of the information on the synthetic plastic tape may be done by cutting and removing the synthetic plastic material by means of the styli, or by having the styli displace or cold flow the synthetic plastic material rather than to remove or cut away the same, the term "embossing" being used generically herein with respect to both methods. In the former case, the embossing conforms quite closely to the cross section of the cutting stylus. In the latter case, each embossed scanning line consists of a depressed central portion and raised marginal portions which are modulated in depth and width to provide light refraction and modulation for gray scale display. In this respect, the masked incident light is only from the bottom of the depressed central portion, the tops of the raised marginal portions, and from between the embossed scanning lines, while the projected refracted light is from the slopes of the central and marginal portions.

Further objects of this invention reside in the details of construction of the high brightness storage-display system and in the cooperative relationships between the component parts thereof.

Other objects and advantages of this invention will become apparent to those skilled in the art upon reference to the accompanying specification, claims and drawings, in which:

Figures 1, 3, 4:
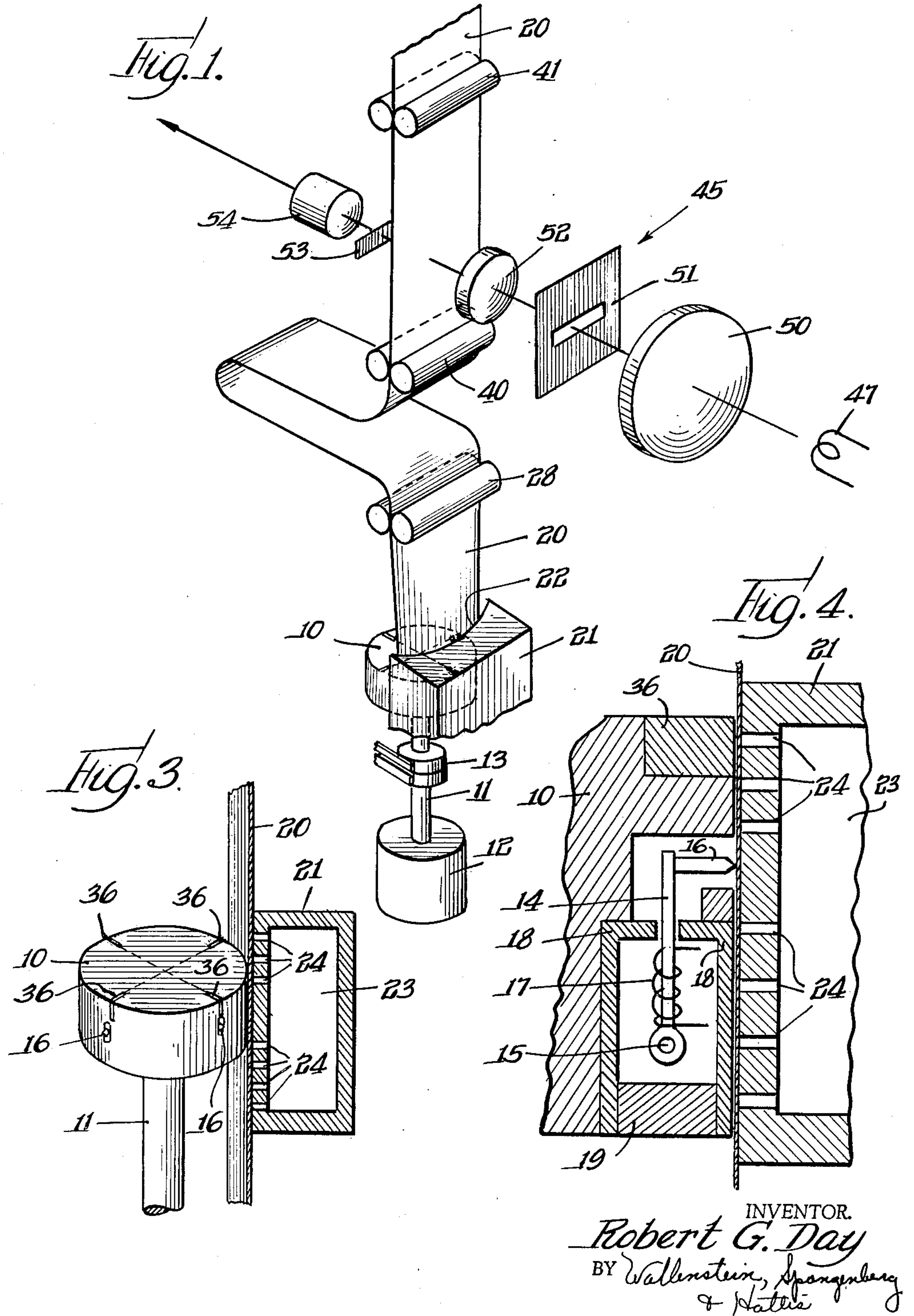
FIG. 1 is a perspective view of a portion of one type of the high-brightness storage-display system of this invention.
FIG. 3 is a partial sectional view, partly in perspective, illustrating the recording head and vacuum hold-down device utilized in FIGS. 1 and 2.
FIG. 4 is an enlarged vertical sectional view through a portion of the recording head and the vacuum hold-down device.

Referring first to FIGS. 1 to 4, the high-brightness storage-display system of this invention includes a rotating recording head 10 driven by a shaft 11 rotated by a synchronous motor 12. The shaft 11 carries slip rings 13 for transmitting electrical signals to the rotating recording head 10. As shown more clearly in FIGS. 3 and 4, the rotating recording head 10 is provided with four embossing styli arrangements equally spaced about the circumference of the recording head. Each embossing stylus arrangement includes an armature 14 pivoted at 15 for operating a stylus 16 which projects radially outwardly from the recording head 10. An operating coil 17 arranged about the armature 14 vibrates the armature 14 in accordance with the signal applied to the operating coil 17 through the slip rings 13, the armature being arranged between a pair of pole pieces 18 connected to a permanent magnet 19. The permanent magnet 19 provides a constant flux of fixed polarity across the gap in the pole pieces 18. The armature 14 is made of a magnetic material and, therefore, becomes an electromagnet when the signal to be recorded is passed through the coil 17 around it. As the instantaneous flux in the armature, caused by the signal current in the winding, puts a north pole in the pole piece gap, the armature will move toward the south pole caused by the permanent magnet, and vice versa when the coil current is reversed. This action provides stylus motion in accordance with the direction of and in proportion to the amplitude of the driving signal. Damping material may be placed between the armature and the pole pieces and around the pivots to prevent mechanical overshooting and ringing. Thus, the embossing styli 16, which are equally spaced about the circumference of the recording head 10, are vibrated inwardly and outwardly with respect to the rotating recording head 10 in an amount and to an extent dependent upon the direction and amplitude of the signals applied to the slip rings 13.

A flexible smooth transparent synthetic plastic tape 20 is arranged adjacent to the rotating recording head 10 and it is held in curved position adjacent to the periphery of the rotating recording head 10 by a vacuum hold-down device 21 having a curved surface 22 concentric with the rotating recording head 10. In this way the flexible clear synthetic plastic tape 20 is caused to conform to the circumference of the rotating head 10 but yet be spaced slightly away therefrom. The curved wall 22 of the vacuum hold-down device 21 is provided with a plurality of openings 24 which communicate with a vacuum chamber 23 within the device 21. The vacuum in the chamber 23 operates in conjunction with the holes 24 for holding the tape 20 against the curved wall 22 of the device in accurate and close proximity to the rotating recording head 10. In this way the curved wall 22 of the vacuum hold-down device 21 operates as a platen for the tape 20 as it is embossed by the embossing styli 16.

The flexible smooth transparent synthetic plastic tape 20 may be fed from a roll 26 of such tape and guided by means of pairs of feed rolls 27 and 28 past the recording head 10. During the embossing of the tape 20, the tape is preferably advanced at a constant speed. In this respect, the tape may be advanced by a pair of feed rolls 41, which, if desired, may be driven by suitable mechanical means 29, such as gearing or the like, from the shaft 11 of the synchronous motor 12, or independently of the shaft 11 by a separate motor.

The signals for operating the embossing styli 16 of the rotating recording head 10 may be provided by a conventional video or facsimile system which scans the information to be recorded and displayed and which transmits the same to a video amplifier 31. Here, it is assumed that the signals transmitted to the video amplifier 31 include video signals and also line synchronizing signals. The video amplifier 31 feeds into a synchronizing separator 32 for separating the video signals from the line synchronizing signals, the video signals being transmitted to a video driver amplifier 33 which, in turn, applies the amplified video signals to the slip rings 13 for operating the embossing styli 16 in the rotating recording head 10 which, in turn, emboss the transmitted video information onto the synthetic plastic tape 20 in plurality transverse scanning lines.

Figure 5:
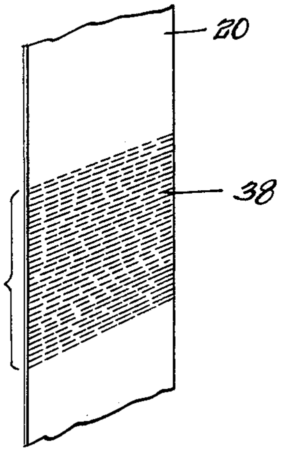
FIG. 5 is a perspective view of a portion of the synthetic plastic tape illustrating a frame of embossed transverse scanning lines thereon.

The line synchronizing signals are transmitted from the synchronizing separator 32 to a phasing circuit 34 which, in turn, controls a power amplifier 35 for operating the synchronous motor 12 at a constant speed in accordance with the line synchronizing signals applied to the phasing circuit 34. In order to assure proper angular positioning of the rotating head 10, there is provided an angular position detecting means including a plurality of magnetic chips 36 carried by the rotating head which applies pulses to an angular position pickup and pulse generator 37, the latter applying its pulse signals to the phasing circuit 34. This arrangement may correspond to that disclosed in Patent No. 2,847,628 issued Aug. 12, 1958. By reason of this arrangement, the angular position of the rotating recording head 10 is accurately maintained in synchronism with the line synchronizing pulses applied by the synchronizing separator 32 to the phasing circuit 34. Accordingly, accurate line embossing on the tape 20 is maintained in accordance with the line scanning of the information to be recorded by the video or facsimile system feeding into the video amplifier 31. As a result, the information to be recorded is accurately embossed on the flexible smooth transparent synthetic plastic tape 20 in a plurality of transverse scanning lines 38, as illustrated in FIG. 5.

The diameter of the recording head 10 is so chosen that the distance between each of the embossing styli 16 equals one scan line length of the tape 20. The tape 20 is moved across the recording head 10, preferably, at a constant rate which is chosen to cause successive lines to be embossed thereon in a parallel array with minimum interline interference and maximum packing. Embossing at a recorded resolution of .001″ is readily accomplished and so are embossing speeds of 50″ per second. When a .001″ line spacing is utilized, when a 4″ circumference recording head with four styli rotating at $$4\times\frac{50}{\pi D}=50 \text{ r.p.s. (3000 r.p.m.)}$$

is utilized, and where each embossing stylus marks with a .001″ resolution, then a 1000 by 1000 array of elements is recorded in a 1″ square on the tape in 1000/50 or 20 seconds. Accordingly, resolution of at least 1000 by 1000 elements is readily obtained on a 1″ by 1″ format and frame times of about 20 seconds are obtained for such 1000 line recording or embossing densities.

Figure 2:
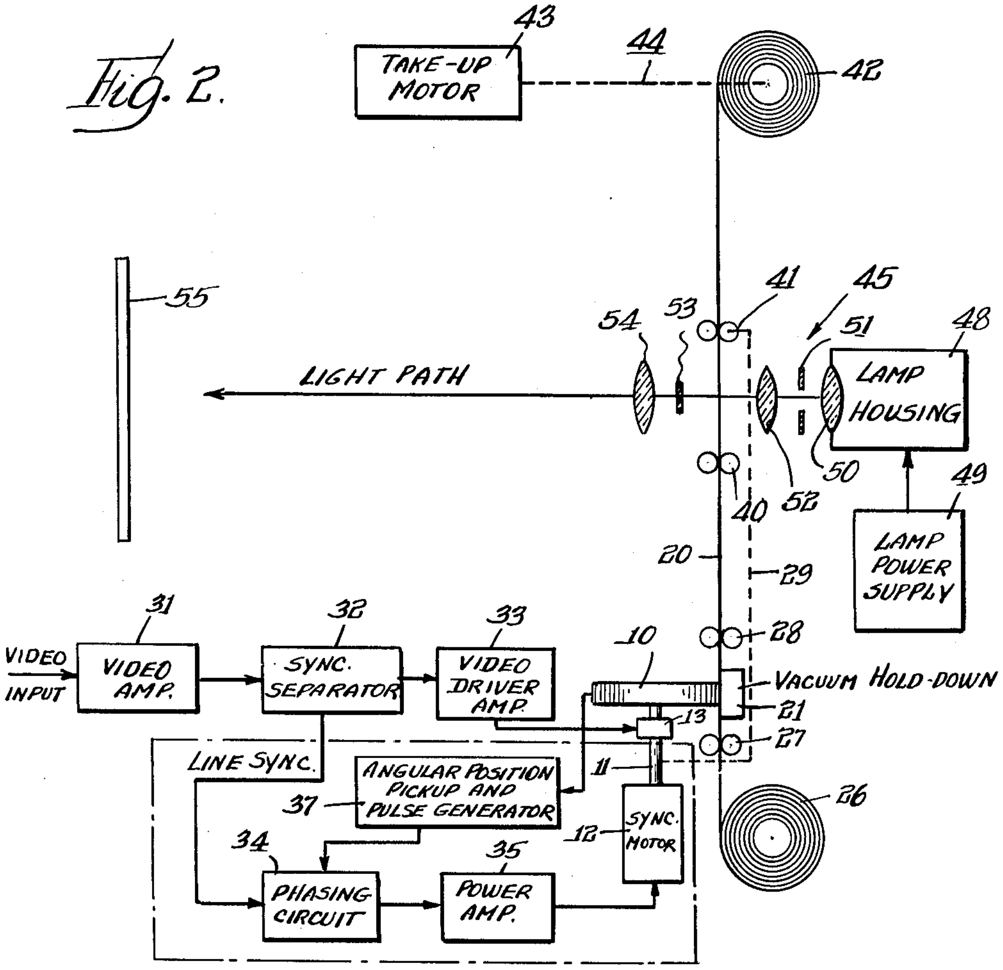
FIG. 2 is a diagrammatic view of one form of the high-brightness storage-display system substantially as illustrated in FIG. 1.

As shown in FIGS. 1 and 2 the embossed tape 20 is transported from the recording head 10 by pairs of feed rolls 40 and 41 to a takeup roll of tape 42, the takeup roll of tape 42 being operated by a suitable takeup electric motor 43 through suitable frictional driving means 44 or the like. The pair of feed rolls 41, is driven at a desired speed by the mechanical driving means 29, as expressed above. As the embossed tape is so transported, it is passed through a light projection apparatus generally designated at 45. The light projection apparatus 45 includes a lamp 47 arranged in a lamp housing 48 and powered by a lamp power supply 49. The light from the lamp 47 passes through a condensing lens 50, through a schlieren aperture slit 51, through a schlieren lens 52, through the transparent embossed synethetic plastic tape 20 past a schlieren bar or stop 53, and through a projection lens 54 onto a projection screen 55. This projection system, including the schlieren stop system, operates to project onto the projection screen 55 the embossed information on the tape 20, the projected information on the projection screen 55 corresponding to the original information scanned by the aforementioned conventional video or facsimile system.

Figures 7, 8, 9, 10:
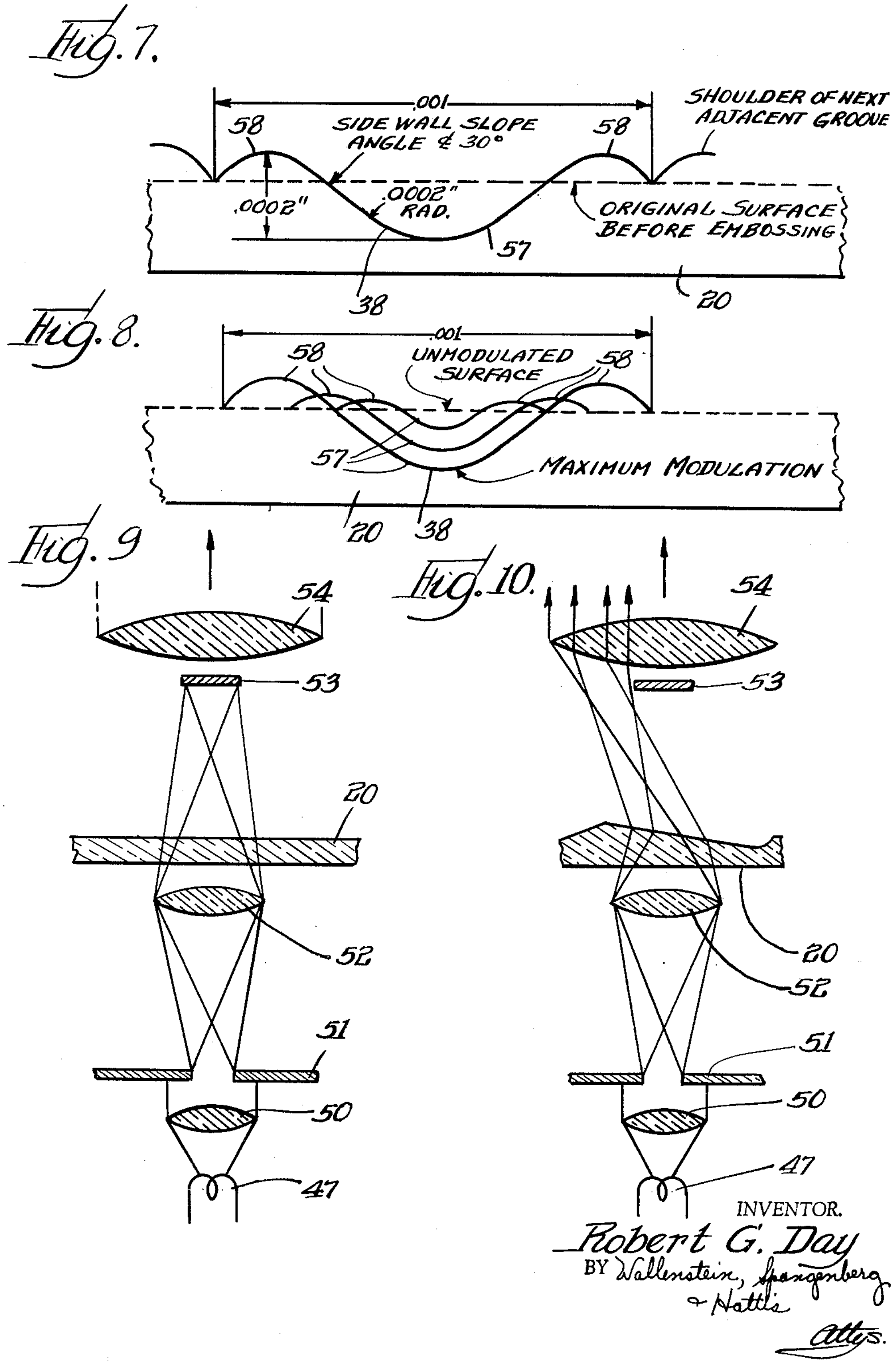
FIG. 7 is an enlarged diagrammatic view illustrating the embossed scanning line on the tape.
FIG. 8 is an enlarged diagrammatic view similar to FIG. 7 illustrating the modulation of the embossed scanning line.
FIGS. 9 and 10 are diagrammatic views showing the manner of operation of the light projection system of the form of the invention shown in FIG. 1.

The manner in which the projection system 45 operates is illustrated in FIGS. 9 and 10. The light from the light source 47 is collected and converged by the condensing lens 50 onto the aperture slit 51. The aperture slit 51 is imaged by the schlieren lens 52 on the opaque schlieren bar stop 53 which prevents any light from passing on into the projection lens 54. The width of the schlieren bar stop 53 is slightly larger than the image of the aperture slit 51 so as to provide a positive shutoff of the light and to compensate for minor imperfections in the smooth transparent synethetic plastic tape 20. The projection lens 54 is arranged to image the surface of the synthetic plastic tape 20 on the projection screen 55. If the surface of the synethtic plastic tape 20 is deformed, for example as illustrated in FIG. 10, the light rays are deflected or bent by refraction as they emerge from the tape 20 and if the slope of the deformation is sufficiently great, they are deflected or bent off the opaque bar stop 53 and allowed to pass into the projection lens 54 and hence to the projection screen 55. Thus, only light from deformed points on the surface of the transparent synthetic plastic tape 20 reach the projection screen 55, and a light pattern appears on the projection screen in correspondence with the deformations on the surface of the transparent synethetic plastic tape 20. The width of the schlieren bar stop 53 is small compared to the distance from the schlieren bar stop 53 to the plane of the transparent synthetic plastic tape 20 so that the required refraction angle at the top and the bottom of the embossed frame of information is essentially the same as at the middle of the embossed frame. If desired, a plurality of aperture slits and bar stops, such as grates or the like, may be utilized.

In accordance with this invention, the flexible transparent synthetic plastic tape 20 has an index of refraction different from air so as to provide proper projection of the embossed information, the transparent tape preferably being optically clear, having a reasonably high refractive index, being flexible, being relatively stable in dimension, and being capable of relatively high speed embossing. Some materials which meet these requirements are Mylar, Teflon, cellulose acetate, vinyl chloride, polyethylene, Lucite, vinyl butyral, and polystyrene film. Mylar is particularly suitable for meeting these requirements and it having a refractive index of 1.6. The synthetic plastic tape 20 may be suitably tinted if the projected information is to be displayed in color.

The recording styli 16 are preferably provided with a diamond embossing tip which, for example, has a tip radius of 0.2 mil. The embossed line or groove 38 is produced by this embossing tip by drawing the same along the surface of the tape 20 under pressure. In so doing the tape material undergoes cold flow and takes a permanent deformation, but no material is removed. The surface of the groove retains the original smoothness of the tape and tends to conform in shape to the stylus cross section. Modulation is obtained by vertical movement of the stylus tip with respect to the synthetic plastic tape 20. Where the stylus tip has a radius of 0.2 mil, the groove produced thereby may have an overall width of .001" and permits embossing 1000 lines per inch as shown in FIGS. 7 and 8, representative dimension being thereshown. Light is actually refracted in four bands from the embossed groove illustrated in FIG. 7, at each side wall of the recessed portion 57 and at the outside slopes of each of the small raised or horn portions 58. The appearance on the screen is such that each scan line actually appears, on close examination, to be made up of four separate bright bands, two wide center bands with two narrow bands on either side. The dark areas between the bands correspond to the bottom of the recessed portion 57 and the tops of the raised portion 58 where no refraction occurs. This is advantageous since it tends to give the final display a line structure which is finer by a factor of four than that actually embossed, making the scanning lines somewhat less visible. As a typical example, the side wall slope angle of the recessed portion may be substantially 30° and for a synthetic plastic material, such as Mylar, having a refractive index of 1.6, the light deviation obtained for the 30° effective side wall slope may be substantially 23°. Because of this and because of relatively abrupt changes in slope, which provide for minimum area of surface at the bottom of the recessed portion 57 and at the tops of the raised portions 58 which will not refract, the dark bands are maintained at a minimum and, hence, there is provided an optimum amount of lumens actually directed to the projection screen.

The modulation in the scanning lines is accomplished by moving the styli vertically with respect to the synthetic plastic tape in accordance with the modulating signal which gives the modulating result illustrated in FIG. 8. It is noted that there is some tendency as the groove gets narrower for the effective side wall slope to decrease as well as the effective overall groove width. These effects reinforce each other since the lines will dim as they shrink in size. Accordingly, the production of a pronounced gray scale is readily obtainable.

In the form of the invention illustrated in FIG. 2 the feed rolls 41, which advance the tape 20, are driven at a substantially constant speed and, thus, as the embossed information on the tape 20 passes the projection system 45, the embossed information is projected onto the projection screen 55 in a moving fashion.

Figure 6:
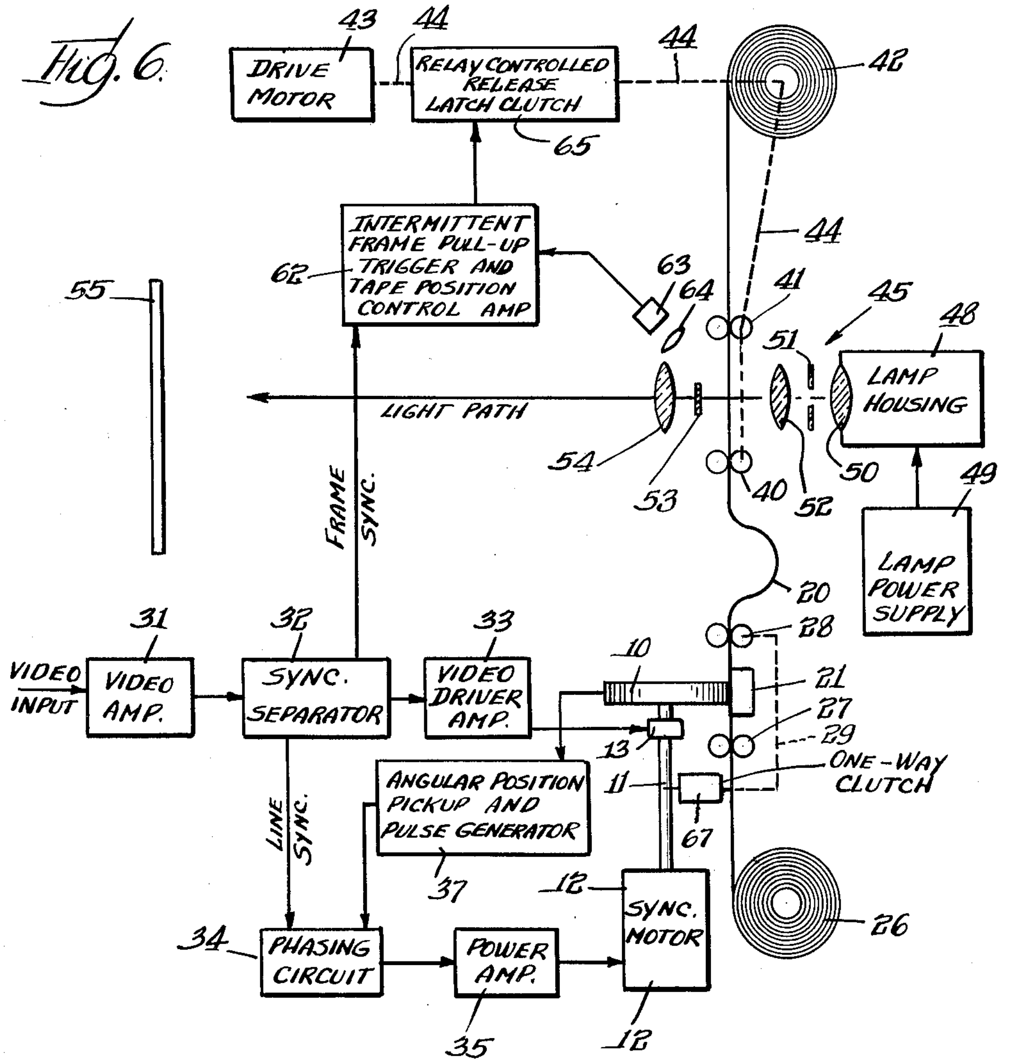
FIG. 6 is a diagrammatic view similar to FIG. 2 but illustrating another form of the high-brightness storage-display system of this invention.

Referring now to the form of the invention illustrated in FIG. 6, the information is embossed on the smooth transparent synthetic plastic tape 20 in the same manner as discussed above and like reference characters have been utilized for like parts. Here, also, the projection system 45 corresponds to the projection system described above and like reference characters have been utilized for like parts. The form of the invention illustrated in FIG. 6 differs from that illustrated in FIG. 2 in that in FIG. 6 the information is embossed on the transparent synthetic plastic tape 20 in spaced apart frames and the frames are stationarily positioned adjacent the projection system 45 for stationarily displaying the information on the projection screen 55.

In FIG. 6 the video input, in addition to containing video signals and line synchronizing signals, also contains frame synchronizing signals, the latter signals being fed to an intermittent frame pullup trigger and tape positioning control amplifier 62. The frame synchronizing signal operates this amplifier 62 at the conclusion of the embossing of a frame of information on the tape 20. This signal operates to engage a relay controlled release latch clutch 65 which is located in the mechanical connection 44 between the drive motor 43 and the feed rolls 41 and the roll of tape 42 to drive the same. The drive motor 43, which is continuously operating, operates at a faster speed than the drive motor 43 of FIG. 2 in order to rapidly advance the tape 20 when the frame synchronizing signal so commands. When the frame of embossed information which has just been recorded reaches the projection system 45, a photocell 63 focused on the tape 20 by the lens 64 operates the amplifier 62 to disengage the relay controlled release latch clutch 65 in order to stop the advance of the tape 20 with the embossed frame of information stationarily centered in the projection system 45.

In order to allow this rapid pullup of the tape 20 following the embossing of a frame of information on the tape, a one-way clutch 67 is provided in the mechanical connections 29 between the synchronous motor 12 or other source of feed roll drive and the feed rolls. Thus, in accordance with the arrangement of FIG. 6, while the frame of information is being embossed upon the tape 20 by the rotating recording head 10, the frame of information previously embossed on the tape 20 is being stationarily displayed on the projection screen 55 by the projection system 45. Since the tape during projection is held stationary by the feed rolls 41 and since the tape is being continuously advanced by the feed rolls 28 during the embossing of the frame of information thereon, the tape will loop out as indicated in FIG. 6 between the feed rolls 28 and 40. When, however, the amplifier 62 is operated upon completion of the embossing of the frame of information on the tape 20, the tape is rapidly advanced by the feed rolls 41 to eliminate the looping out of the tape and to advance the just recorded frame of information to centered position in the projection system 45. When this occurs, the last recorded frame of embossed information is stationarily displayed on the projection screen 55 and the recording of a new frame of information is commenced.

Figure 11:
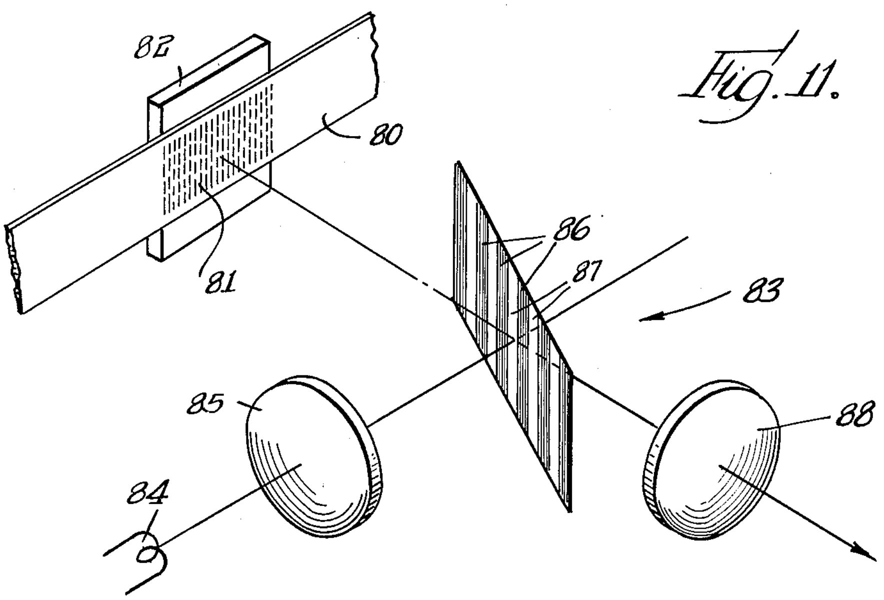
FIG. 11 is a perspective view of another type of the high-brightness storage-display system of this invention having a different light projection system.
Figure 12:
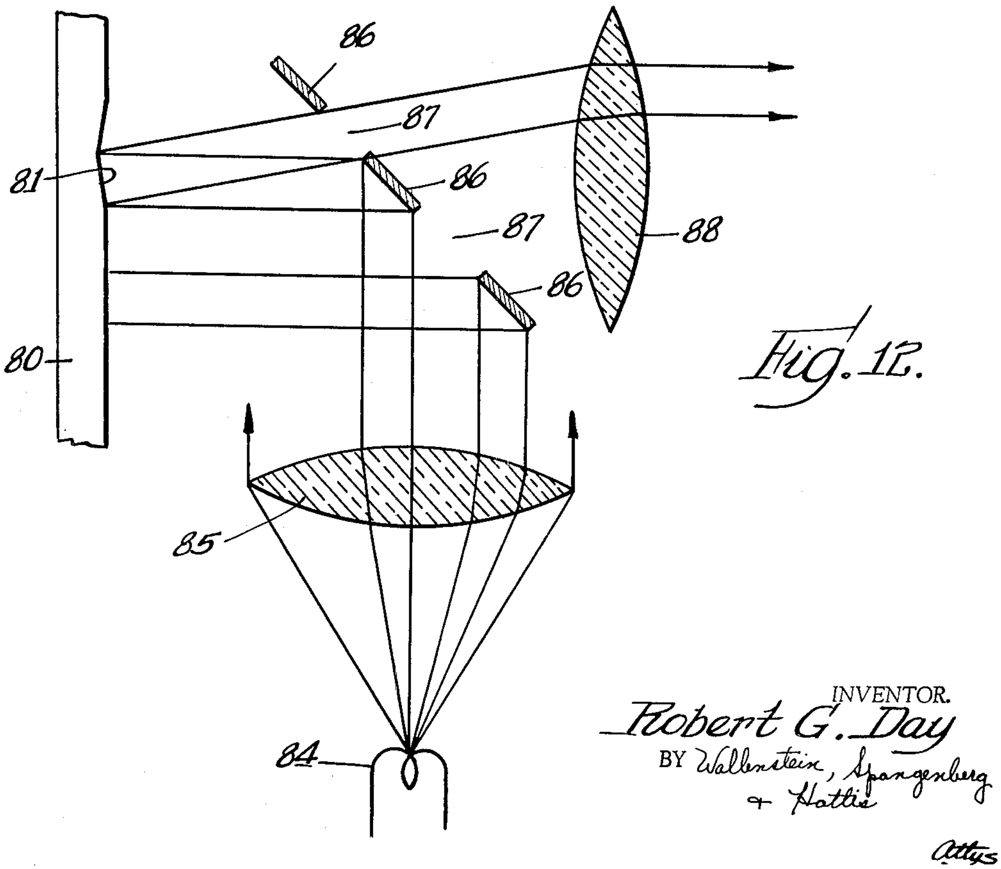
FIG. 12 is a diagrammatic view showing the manner of operation of the light projection system of FIG. 11.

Referring now to FIGS. 11 and 12 there is disclosed another type of high-brightness storage-display system of this invention. The system of FIG. 11 is substantially the same as the systems discussed above with the exception that here a different form of light projection system is utilized, which operates on a light reflection basis as distinguished from a light refraction basis. Thus instead of utilizing a smooth transparent synthetic plastic tape 20 as above, there is here utilized a smooth reflecting synthetic plastic tape 80 so as to reflect light as distinguished from passing light therethrough. The smooth synthetic plastic tape 80 may be opaque, if desired, but should have good light reflecting characteristics. It should also be flexible, be relatively stable in dimension and be capable of relatively high speed embossing. Some materials which meet these requirements are Mylar, Teflon, cellulose acetate, vinyl chloride, polyethylene, Lucite, vinyl butyral, and polystyrene film. The smooth reflecting synthetic plastic tape 80 may be actually embossed in scanning lines as described above, such scanning lines being indicated at 81 in FIGS. 11 and 12.

The tape 20, after it is embossed, is transported to a light projection system generally designated at 83 which includes a back-up plate 82 for the tape and a light source 84. The light from the source 84 passes through a collimating lens 85 and is projected onto a schlieren bar stop having a plurality of stops or bars 86 with slits 87 therebetween. The stops 86 are reflecting stops and reflect light onto the tape 80 at the back-up plate 82, the light being reflected onto the tape 80 at substantially right angles to the smooth reflecting surface thereof. If no embossing is present, the light is reflected back onto the stops or bars 86 and does not pass through the slits 87, as is shown in the lower part of FIG. 12. If, however, the smooth surface of the tape 80 is embossed, as shown in the upper part of FIG. 12, the light is deflected by the embossing and is reflected back through the slits 87. A projection lens 88 projects this deflected and reflected light onto the projection screen so that the information embossed on the tape 80 is visually displayed upon the projection screen.

In other words, the essential difference between the arrangement of FIGS. 11 and 12 and the arrangements disclosed above is that in the arrangement of FIGS. 11 and 12 the embossing deflects the light past the stops or bars by reflection whereas, in the other arrangements discussed above, the embossing deflects the light past the stops or bars by refraction. Substantially the same results are obtained by the light projection system of FIGS. 11 and 12 as by the light projection systems discussed above and, therefore, a further description of this particular form of light projection system is not deemed necessary. The light projection system of FIGS. 11 and 12 may be substituted for the light projection systems in the forms of the invention discussed above to obtain substantially the same mode of operation.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A high-brightness storage-display system comprising, a smooth synthetic plastic tape, recording means including mechanical embossing means engaging a face of the tape for mechanically embossing the same with information, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

2. A high-brightness storage-display system comprising, a smooth transparent synthetic plastic tape, recording means including mechanical embossing means engaging a face of the tape for mechanically embossing the same with information, a light source, means transporting the embossed tape adjacent the light source, means directing light from the light source through the embossed tape, a projection screen, and means including a stop system for masking said screen from light incident from said tape and for projecting onto said screen light refracted by the embossing on said tape for visually displaying the embossed information on said screen.

3. A high-brightness storage-display system comprising, a smooth light reflecting synthetic plastic tape, recording means including mechanical embossing means engaging a face of the tape for mechanically embossing the same with information, a light source, means transporting the embossed tape adjacent the light source, means directing light from the light source onto the embossed tape, a projection screen, and means including a stop system for masking said screen from light incident from said tape and for projecting onto said screen light reflected by the embossing on said tape for visually displaying the embossed information on said screen.

4. A high-brightness storage-display system comprising, a smooth synthetic plastic tape, recording means including embossing styli engaging a face of the tape and means relatively moving the styli and the tape for embossing the tape with information in a pattern of scanning lines, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

5. A high-brightness storage-display system comprising, a smooth synthetic plastic tape, recording means including a rotary head provided with embossing styli engaging a face of the tape and means relatively moving the head and the tape for embossing the tape with information in a pattern of scanning lines, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

6. A high-brightness storage-display system comprising, a smooth synthetic plastic tape, recording means including a platen, a rotating head adjacent the platen provided with embossing styli engaging a face of the tape between the platen and rotary head and means relatively moving the platen and head and the tape for embossing the tape with information in a pattern of scanning lines, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

7. A high-brightness storage-display system comprising, a smooth synthetic plastic tape, means advancing the tape, recording means including embossing styli engaging a face of the advancing tape for embossing the same with information in a plurality of scanning lines, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

8. A high-brightness storage-display system comprising, a smooth synthetic plastic tape, means advancing the tape, recording means including a rotary head provided with embossing styli engaging the face of the advancing tape and a guide member guiding the advancing tape adjacent the rotary head for embossing the advancing tape with information in a plurality of scanning lines, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

9. A high-brightness storage-display system comprising, a smooth synthetic plastic tape, recording means including embossing styli engaging a face of the tape and means relatively moving the styli and the tape for embossing the tape with information in a pattern of scanning lines, each embossed scanning line consisting of a depressed central portion and raised marginal positions, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

10. A high-brightness storage-display system comprising, a smooth synthetic plastic tape, recording means including embossing styli engaging a face of the tape and means relatively moving the styli and the tape for embossing the tape with information in a pattern of scanning lines, each embossed scanning line consisting of a depressed central portion and raised marginal portions which are modulated in depth and width, a light source, means transporting the embossed tape adjacent the light source, means directing light from the light source onto the embossed tape, a projection screen, and means including a stop system for masking said screen from light incident from said tape and for projecting onto said screen light deflected by the embossing on said tape for visually displaying the embossed information on said screen.

11. A high-brightness storage-display system comprising, a smooth synthetic plastic tape, recording means including mechanical embossing means engaging a face of the tape for mechanically embossing the same with information, a light source, means advancing the tape at a substantially constant speed past the recording means and the light source, means directing light from the light source onto the embossed tape, a projection screen, and means including a stop system for masking said screen from light incident from said tape and for projecting onto said screen light deflected by the embossing on said tape for visually displaying in moving fashion the embossed information on said screen.

12. A high-brightness storage-display system comprising, a smooth synthetic plastic tape, recording means including mechanical embossing means engaging a face of the tape for mechanically embossing the same with information, a light source, means advancing the embossed tape at a substantially constant speed adjacent to the light source, means directing light from the light source onto the embossed tape, a projection screen, and means including a stop system for masking said screen from light incident from said tape and for projecting onto said screen light deflected by the embossing on said tape for visually displaying in moving fashion the embossed information on said screen.

13. A high-brightness storage-display system comprising, a smooth synthetic plastic tape, recording means including mechanical embossing means engaging a face of the tape for mechanically embossing the same with information, a light source, means stationarily positioning the embossed tape adjacent the light source, means directing light from the light source onto the embossed tape, a projection screen, and means including a stop system for masking said screen from light incident from said tape and for projecting onto said screen light deflected by the embossing on said tape for visually displaying in stationary fashion the embossed information on said screen.

14. A high-brightness storage-display system comprising, a smooth synthetic plastic tape, recording means including mechanical embossing means engaging a face of the tape for mechanically embossing the same with information in scanning lines, means advancing the tape at a substantially constant speed past the recording means for recording a frame of embossed scanning lines on the advancing tape, a light source, means transporting and stationarily positioning the frame of embossed scanning lines on the tape adjacent to the light source, means directing light from the light source onto the embossed tape, a projection screen, and means including a stop system for masking said screen from light incident from said tape and for projecting onto said screen light deflected by the frame of embossed scanning lines on said tape for visually displaying in stationary fashion the embossed information of the frame on said screen.

15. A high-brightness storage-display system comprising, a smooth synthetic plastic tape, recording means including embossing styli engaging a face of the tape and means relatively moving the styli and the tape for embossing the tape with information in a pattern of scanning lines, each embossed scanning line consisting of a depressed central portion and raised marginal portions, a light source, means transporting the embossed tape adjacent the light source, means directing light from the light source onto the embossed tape, a projection screen, and means including a slit and bar stop system for masking said screen from light incident from said tape and for projecting onto said screen light deflected by the slopes of the central and marginal portions of the embossed scanning lines on said tape for visually displaying the embossed information on said screen.

16. A high-brightness storage-display system comprising, a smooth synthetic plastic tape, recording means including embossing styli engaging a face of the tape and means relatively moving the styli and the tape for embossing the tape with information in a pattern of scanning lines, each embossed scanning line consisting of a depressed central portion and raised marginal portions which are modulated in depth and width, a light source, means transporting the embossed tape adjacent the light source, means directing light from the light source onto the embossed tape, a projection screen, and means including a slit and bar stop system for masking said screen from light incident from said tape and for projecting onto said screen light deflected by the slopes of the central and marginal portions of the embossed scanning lines on said tape for visually displaying the embossed information on said screen.

References Cited by the Examiner

UNITED STATES PATENTS 3,113,179 12/63 Glenn ---------------- 178—6.6

OTHER REFERENCES

I.R.E. Dictionary, New York, Institute of Radio Engineers, Inc., 1961, p. 162.

DAVID G. REDINBAUGH, *Primary Examiner.*

ROY LAKE, *Examiner.*